United States Patent
Jeon

(10) Patent No.: US 9,093,892 B2
(45) Date of Patent: Jul. 28, 2015

(54) APPARATUS AND METHOD FOR CONTROLLING MEDIUM VOLTAGE INVERTER

(75) Inventor: Jae Hyun Jeon, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 98 days.

(21) Appl. No.: 13/551,388

(22) Filed: Jul. 17, 2012

(65) Prior Publication Data
US 2013/0020976 A1  Jan. 24, 2013

(30) Foreign Application Priority Data
Jul. 20, 2011  (KR) .................. 10-2011-0071788

(51) Int. Cl.
*H02K 17/32* (2006.01)
*H02M 5/00* (2006.01)

(52) U.S. Cl.
CPC ....................................... *H02M 5/00* (2013.01)

(58) Field of Classification Search
USPC ............. 318/599, 811, 434; 363/55, 56.01, 363/56.07, 56.08, 56.1, 56.11
See application file for complete search history.

(56) References Cited

U.S. PATENT DOCUMENTS

| 4,445,167 A | * | 4/1984 | Okado | 363/56.02 |
| 4,527,214 A | * | 7/1985 | Hattori et al. | 361/96 |
| 7,332,885 B2 | * | 2/2008 | Schnetzka et al. | 318/400.01 |
| 7,468,595 B2 | * | 12/2008 | Lee et al. | 318/802 |
| 7,579,714 B2 | * | 8/2009 | Okui | 307/64 |
| 2006/0119311 A1 | * | 6/2006 | Lee | 318/802 |
| 2007/0151272 A1 | * | 7/2007 | Cosan et al. | 62/228.1 |
| 2010/0176655 A1 | * | 7/2010 | Yokozutsumi | 307/9.1 |
| 2011/0241888 A1 | * | 10/2011 | Lu et al. | 340/626 |
| 2012/0147637 A1 | * | 6/2012 | Petter | 363/74 |

FOREIGN PATENT DOCUMENTS

| CN | 1416614 | 5/2003 | |
| CN | 1868113 | 11/2006 | |
| GB | 2121557 A | * 12/1983 | ............... B66B 5/02 |
| JP | 58-127593 | 7/1983 | |
| JP | 08-223987 | 8/1996 | |
| JP | 2003-324990 | 11/2003 | |
| KR | 10-0434135 | 7/2004 | |

OTHER PUBLICATIONS

Holtz, et al., "Controlled AC Drives with Ride-Through Capability at Power Interruption," IEEE Transactions on Industry Applications, vol. 30, No. 5, Sep. 1994, pp. 1275-1283.

* cited by examiner

*Primary Examiner* — Rina Duda
*Assistant Examiner* — Bickey Dhakal
(74) *Attorney, Agent, or Firm* — Lee, Hong, Degerman, Kang & Waimey

(57) ABSTRACT

Provided is an apparatus and method for controlling medium voltage inverter, whereby a frequency outputted by the medium voltage inverter is fixed, in a case an instantaneous power interrupt occurs while the medium voltage inverter drives a motor, and a voltage level of an AC power generated by the medium voltage inverter is reduced and outputted in response to a predetermined deceleration slope to control the medium voltage inverter.

5 Claims, 9 Drawing Sheets

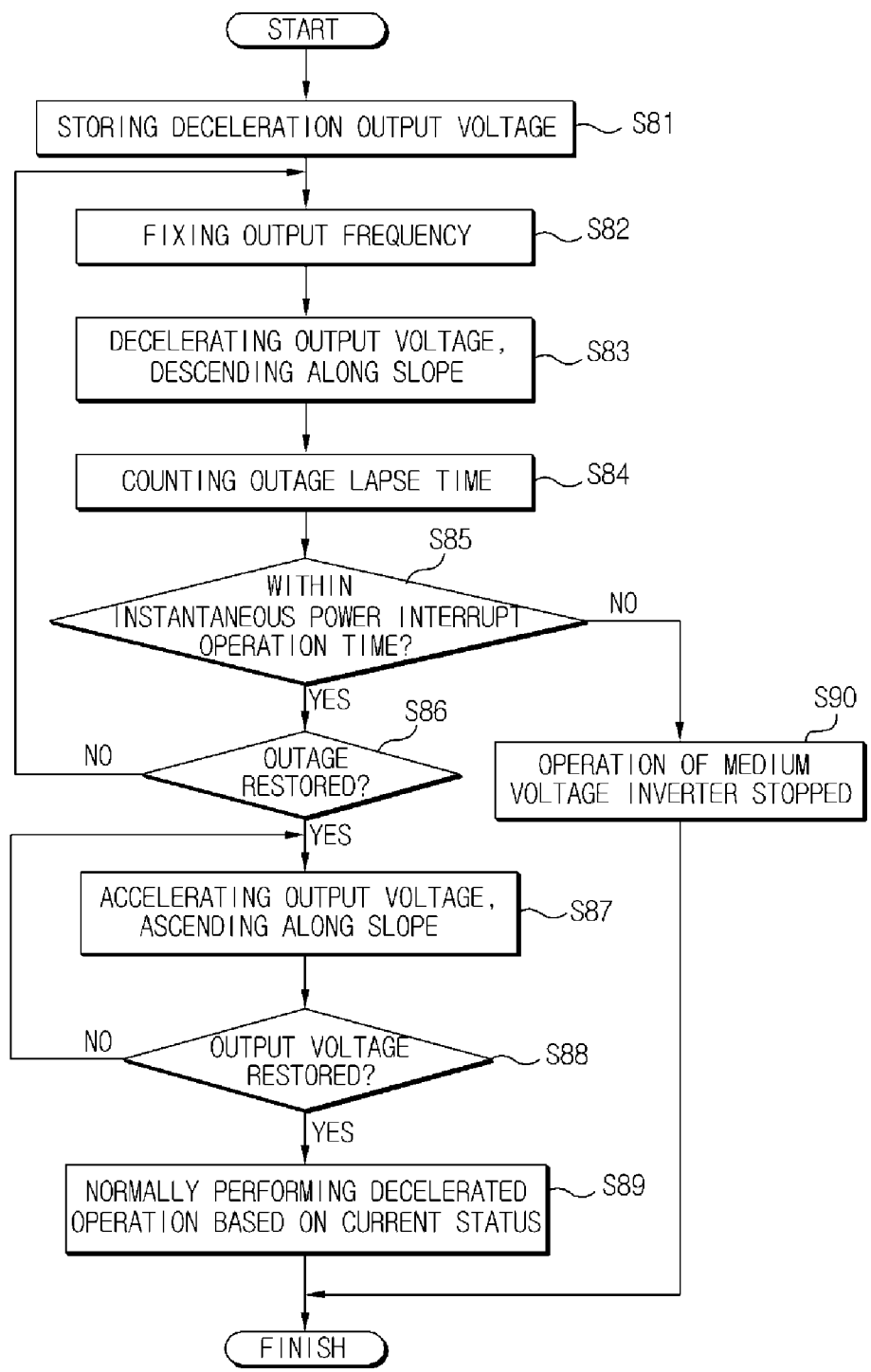

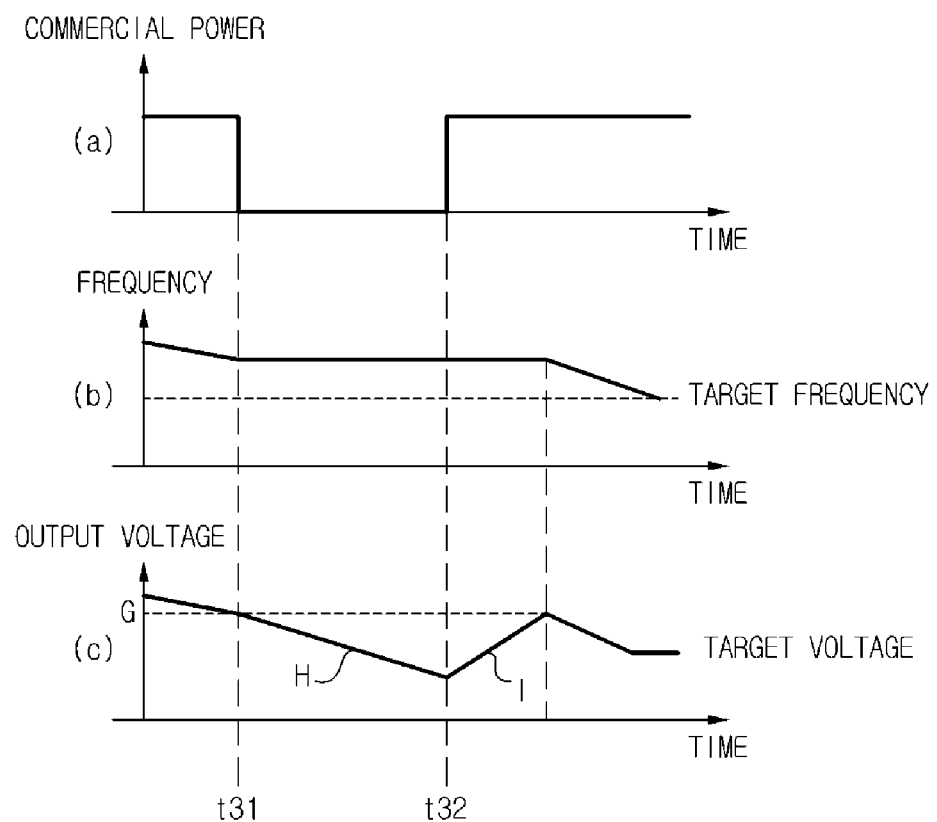

APPARATUS AND METHOD FOR CONTROLLING MEDIUM VOLTAGE INVERTER

Pursuant to 35 U.S.C. §119 (a), this application claims the benefit of earlier filing date and right of priority to Korean Patent Application No. 10-2011-0071788, filed on Jul. 20, 2011, the contents of which is hereby incorporated by reference in their entirety.

BACKGROUND OF THE DISCLOSURE

1. Field of Endeavor

The present disclosure relates to an apparatus and method for controlling medium voltage inverter.

2. Background

This section provides background information related to the present disclosure which is not necessarily prior art.

In general, equipment referred to as a power converter, inverter or drive is employed to provide power to another piece of equipment such as a motor. Specifically, such an inverter (inverter is used generally herein to refer to inverters, converters, drives) is coupled to a utility connection to receive incoming input power such as a three-phase AC (Alternating Current) power. The inverter conditions the power to provide a conditioned power signal to the equipment to be powered. In this way, incoming power to the equipment may be of improved efficiency, leading to reduced costs to operate the equipment.

However, in a case a commercial AC power is employed for direct use to a medium voltage inverter in industrial fields, a frequency is generally fixed to 60 Hz to hardly save energy. Recently, energy-saving becomes a big issue to contribute to an increased use of medium voltage inverter.

The medium voltage inverter drives a motor using a high voltage such as 3.3 kV, 6.6 kV, or 10 kV, and generally is used to drive an industrial load of large inertia. For a non-limiting example, the medium voltage inverter is widely used to drive loads such as important fans and pumps. In case of a load being a motor rotating a fan, a medium voltage inverter controls a rotation speed of the motor to adjust a wind amount, whereby an optimum energy saving can be realized.

In a case an instantaneous power interrupt is generated by issues such as weather changes and power supply in driving an inertially large load such as a fan or a pump, the medium voltage inverter may generate errors such as trip and the like. Approximately five times of instantaneous power interrupts reportedly occur a year. A fatal failure may be inflicted on essential load facilities if no preventive measure is made to the instantaneous power interrupts, and may create a major problem bringing about defects to products and/or personal injury.

Thus, there is a need to safely drive a motor lest the medium voltage inverter should be generated with a trip, in a case an instantaneous power interrupt occurs.

SUMMARY OF THE DISCLOSURE

This section provides a general summary of the disclosure, and is not a comprehensive disclosure of its full scope or all of its features.

Methods and systems consistent with the present disclosure provide an apparatus for controlling a medium voltage inverter configured to safely drive a motor free from a trip by adjusting an output voltage of the medium voltage inverter, in a case an instantaneous power interrupt occurs while the medium voltage inverter drives the motor, and a method thereof.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for controlling a medium voltage inverter, the medium voltage inverter including a plurality of serially connected single-phase inverters and outputting a high voltage to drive a motor, the apparatus comprising: an outage detector detecting whether an outage occurs or whether power is recovered; and a controller fixing a frequency of AC (Alternating Current) power generated by the medium voltage inverter to a frequency at the time of detection of outage by the outage detector, reducing a voltage level of the AC power generated by the medium voltage inverter in response to a predetermined reduction slope, and outputting the reduced voltage level.

In some exemplary embodiments, the controller may preset the reduction slope configured to reduce an output voltage of the medium voltage inverter, in a case the outage occurs.

In some exemplary embodiments, the controller may control the medium voltage inverter in response to status of the medium voltage inverter prior to occurrence of the outage, in a case the outage detector detects the power restoration prior to lapse of a predetermined time.

In some exemplary embodiments, the controller may preset an acceleration slope configured to increase an output voltage of the medium voltage inverter, in a case the power is restored within the predetermined time.

In some exemplary embodiments, the medium voltage inverter may drive a motor in any one mode of a fixed speed operation prior to occurrence of outage, an acceleration operation and a deceleration operation.

In some exemplary embodiments, the controller may increase the output voltage of the medium voltage inverter in response to the acceleration slope, in a case the medium voltage inverter runs at a fixed speed operation prior to occurrence of outage, and in a case the power restoration is detected prior to lapse of the predetermined time.

In some exemplary embodiments, the controller may increase the output voltage of the medium voltage inverter in response to the acceleration slope, in a case the medium voltage inverter runs at the acceleration operation prior to occurrence of outage, and in a case the power restoration is detected prior to lapse of the predetermined time, and increase an output frequency of the medium voltage inverter and the output voltage to a target frequency and a target voltage, in a case the output voltage of the medium voltage inverter is restored to an output voltage prior to the occurrence of outage.

In some exemplary embodiments, the controller may decrease the output voltage of the medium voltage inverter in response to the deceleration slope, in a case the medium voltage inverter runs at the deceleration operation prior to occurrence of outage, and in a case the power restoration is detected prior to lapse of the predetermined time, and decrease an output frequency of the medium voltage inverter and the output voltage to a target frequency and a target voltage, in a case the output voltage of the medium voltage inverter is restored to an output voltage prior to the occurrence of outage.

The apparatus and method for controlling a medium voltage inverter according to exemplary embodiments of the present disclosure has an advantageous effect in that a frequency outputted by the medium voltage inverter is fixed, in a case an instantaneous power interrupt occurs while the medium voltage inverter drives a motor, and an output voltage is reduced and outputted, such that no trip is generated on the medium voltage inverter, in a case the instantaneous power interrupt is restored within an operation set time of the instantaneous power interrupt to enable a normal operation of the motor again.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIG. 8 is a detailed flowchart illustrating a method for controlling a medium voltage inverter during an instantaneous power interrupt in response to a decelerated operation at S40 of FIG. 3 according to an exemplary embodiment of the present disclosure; and FIG. 9 is a schematic view illustrating a relationship among a commercial power, a frequency and an output voltage during control of FIG. 8.

DETAILED DESCRIPTION

Figure 1:
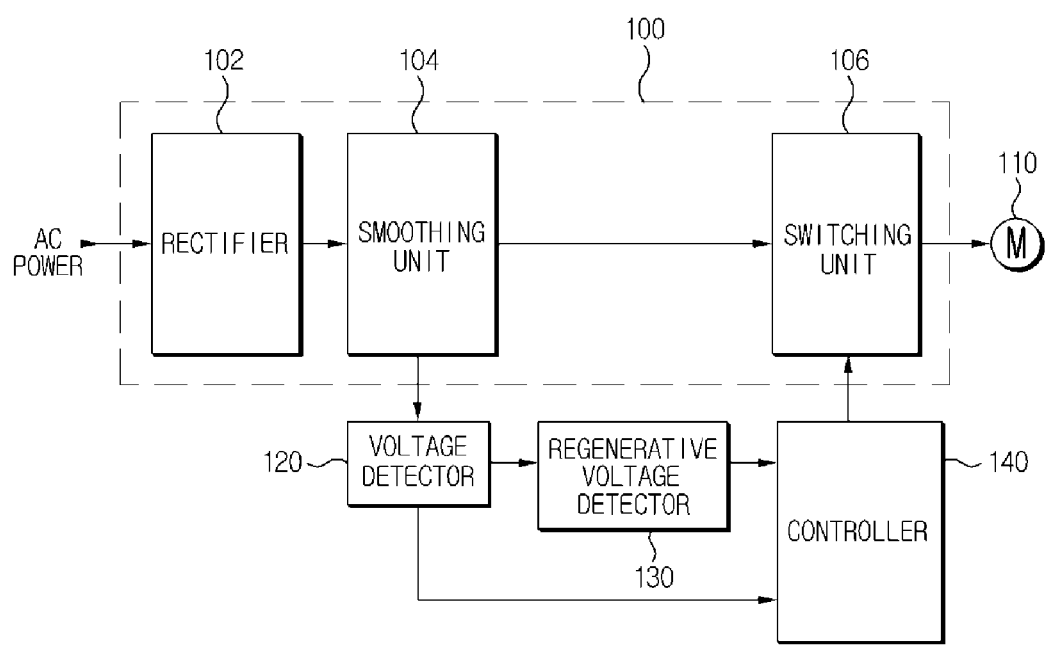
FIG. 1 is a structural view of an inverter according to prior art.

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, an apparatus and method for controlling a medium voltage inverter according to the present disclosure will be described in detail with reference to the accompanying drawings, following explanation of control of a conventional inverter.

FIG. 1 is a structural view of an inverter according to prior art.

An inverter (100) converts an incoming AC power to a DC (Direct Current) power, switches the converted DC power to AC power in response to a switching control signal, and outputs the AC power to a motor (110), whereby the motor (110) is driven, where the motor (110) may be used to drive a load such as a fan or a pump widely used in industrial sites.

The inverter (100) includes a rectifier (102), a smoothing unit (104) and a switching unit (106). The rectifier (102) serves to rectify an AC power inputted from outside and convert to a ripple power. The smoothing unit (104) serves to smooth the ripple power rectified by the rectifier (102) and convert to a DC power. The switching unit (106) serves to switch the DC power smoothed by the smoothing unit (104) in response to a switching control signal, convert to AC power, and output the converted AC power to the motor (110) whereby the motor (110) is driven.

A voltage detector (120) functions to detect a level of DC voltage outputted to the switching unit (106) by the smoothing unit (104), and a regenerative voltage detector (130) uses the output voltage of the voltage detector (120) to detect a level of regenerative voltage charged to a capacitor of the smoothing unit (104) through the switching unit (106), in a case an instantaneous power interrupt (hereinafter referred to as outage) occurs.

Hereinafter, the instantaneous power interrupt and the outage may be alternatively used.

The controller (140) generates a switching control signal in response to the voltage detected by the voltage detector (120) and the regenerative voltage detected by the regenerative voltage detector (130), and outputs the generated switching control signal to the switching unit (106) of the inverter (100).

In the inverter (100) thus configured, the rectifier (102) of the inverter (100) rectifies the commercial AC power inputted from outside to a ripple power, and the smoothing unit (104) smoothes the rectified ripple power to a DC power, where the converted DC power is supplied to the switching unit (106). Under this state, the controller (140) generates the switching control signal in response to various sensor signals and state signals according to driving of the motor (110).

The switching unit (106) switches the DC power outputted by the smoothing unit (104) in response to the switching control signal generated by the controller (140) to generate an AC power, where the generated AC power is applied to the motor (110) which is then driven or run.

Under these circumstances, the voltage detector (120) detects the level of the DC power outputted by the smoothing unit (104) to the switching unit (106), and outputs the detected level of The DC power to the controller (140). The regenerative power detector (130) uses the detected voltage to detect a regenerative voltage generated by occurrence of instantaneous power interrupt, and outputs the detected regenerative voltage to the controller (140).

Under these circumstances, the controller (140) uses the output voltages of the voltage detector (120) and the regenerative voltage detector (130) to determine whether the instantaneous power interrupt has occurred.

As a result of the determination, if the instantaneous power interrupt has occurred, the controller (140) measures the regenerative voltage detected by the regenerative voltage detector (130) and compares an outage reference voltage, a low-voltage trip voltage, a restored power reference voltage and regenerated amount based on the measured regenerative voltage to drive the inverter (100) under a normal mode, interrupts the output voltage of the inverter (100), or is operated under an outage mode to reduce a frequency of the AC power outputted by the inverter (100), whereby, even if there is generated an instantaneous power interrupt, a driving speed of the motor (110) is reduced while the motor (110) is not stopped to minimize damage caused by the outage of the motor (110).

However, in a case a large load such as a medium voltage inverter is driven, switching elements comprising the switching unit (106) may be damaged by over-voltage generated by regenerative voltage by the load. That is, a medium voltage inverter is generally used by a plurality of single-phased inverters being serially connected, such that there is a high probability of generating a trip by the regenerative voltage, as the switching elements approach a neutral point because the number of switching elements varies according to an outputted level of voltage.

Figure 2:
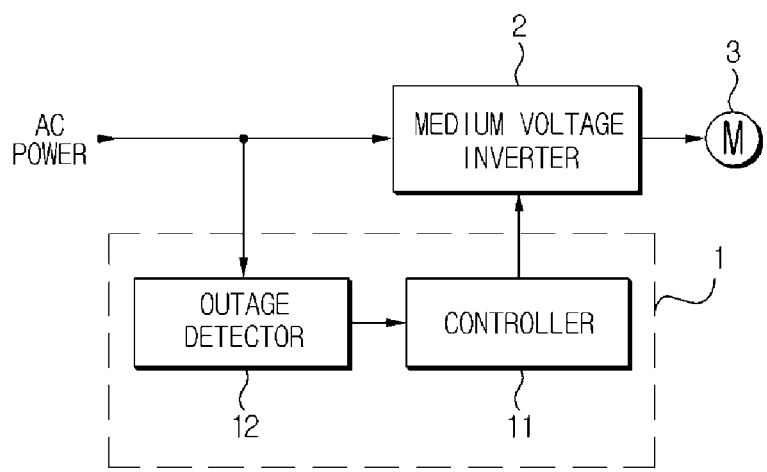
FIG. 2 is a structural view illustrating an apparatus for controlling a medium voltage inverter according to an exemplary embodiment of the present disclosure.

FIG. 2 is a structural view illustrating an apparatus for controlling a medium voltage inverter according to an exemplary embodiment of the present disclosure.

Referring to FIG. 2, a control device (10) according to the present disclosure functions to control a medium voltage inverter (2) driving a motor (3). The medium voltage inverter (2) converts an AC power inputted from outside to a DC power through rectifying and smoothing operations, and the converted DC power is switched by the switching control signal to an AC current, the explanation of which has been already provided in the foregoing.

Furthermore, as expounded, the medium voltage inverter (2) is configured by serially connecting a plurality of single-phased inverters to output high voltage, such that detailed explanation of the configuration thereto will be omitted herein.

Referring to FIG. 2, the control device (1) comprises a controller (11) and an outage detector (12). The outage detector (12) detects whether an AC power inputted from outside is inputted by outage or the like. Furthermore, the outage detector (12) detects whether the power is restored after the outage.

The controller (11) drives the medium voltage inverter (2) by generating a switching control signal in response to a control signal inputted from outside, fixes a frequency of AC (Alternating Current) power generated by the medium voltage inverter (2) during a predetermined time to a frequency at the time of detection of outage by the outage detector (12), in a case the outage is detected by the outage detector (12), reduces a voltage level of the AC power generated by the medium voltage inverter (2) in response to a predetermined reduction slope, and outputs the reduced voltage level.

In a case the AC power is restored to a normal state prior to lapse of the predetermined time, the medium voltage inverter (2) is restored to an original state, and a switching control signal is generated to operate the medium voltage inverter (2) in a normal operation state.

The control device (1) thus configured according to the present disclosure is such that the medium voltage inverter (2) rectifies and smoothes the AC power inputted from outside, and converts the rectified and smoothed AC power to a DC power.

Furthermore, the medium voltage inverter (2) switches the converted DC power in response to a switching control signal generated by the controller (1) to generate a high-voltage AC power, and drives the motor (3) by applying the generated high-voltage AC power to the motor (3).

Under these circumstances, the outage detector (12) determines whether the AC power from the outside is normally inputted. As a result of the determination, if an outage is generated, the outage detector (12) informs the occurrence of outage to the controller (11).

Then, the controller (11) generates a switching control signal so that the voltage level of the AC power generated by the medium voltage inverter (2) in response to a predetermined reduction slope is reduced and outputted, while a frequency of AC (Alternating Current) power generated by the medium voltage inverter (2) during a predetermined time to a frequency at the time of detection of outage by the outage detector.

Under these circumstances, the controller (11) restores the medium voltage inverter (2) to an original state, in a case the AC power is normally supplied again before lapse of the predetermined time, and generates the switching control signal so that the motor (3).

Figure 3:
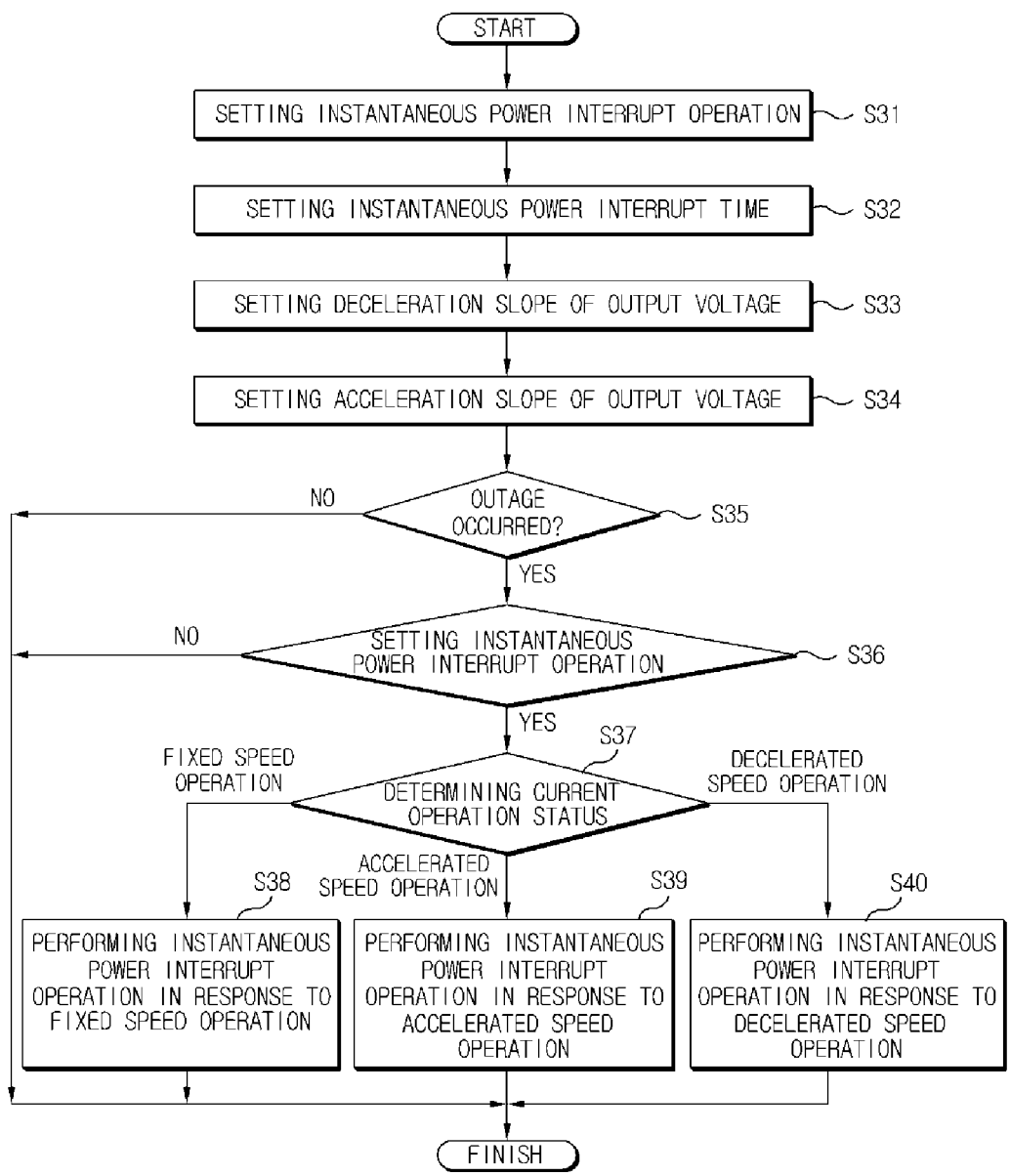
FIG. 3 is a flowchart illustrating a method for controlling a medium voltage inverter according to the present disclosure.

FIG. 3 is a flowchart illustrating a method for controlling a medium voltage inverter according to the present disclosure.

Referring to FIG. 3, first, a user manipulates a user interface (not shown) to determine whether to operate in a case an instantaneous power interrupt occurs (S31). A controller (11) sets an operation time under the instantaneous power interrupt in response to the user manipulation in a case the instantaneous power interrupt operation is set (S32). Successively, a reduced speed slope for decreasing the output voltage is set (S33) in a case an instantaneous power interrupt occurs. Alternatively, an accelerated slope for increasing the output voltage is set (S34) in a case the AC power is re-supplied after the instantaneous power interrupt has occurred.

Under these circumstances, the controller (11) generates a switching control signal in response to a control signal inputted from outside to switch the medium voltage inverter (2), where the medium voltage inverter (2) generates a high AC power having a predetermined frequency and voltage to drive the motor (3).

In a state where the controller (11) switches the medium voltage inverter (2) to drive the motor (3), the outage detector (12) determines whether the outage has occurred where an AC power is not normally supplied, and outputs a determination signal to the controller (11). The controller (11) receives the determination signal of the outage detector (12) in a state where the medium voltage inverter (2) is switched in response to a control signal inputted from outside to determine whether the outage has occurred (S35).

As a result of S35, if it is determined that the outage has not occurred, the controller (11) continuously performs the operation of switching the medium voltage inverter (2) in response to the control signal inputted from the outside, and finishes the operation in response to the occurrence of the instantaneous power interrupt.

As a result of S35, if it is determined that the outage has occurred, the controller (11) determines whether an operation has been set in response to the occurrence of the instantaneous power interrupt (S36). If the operation has not been set in response to the occurrence of the instantaneous power interrupt, the controller (11) stops the operation of the medium voltage inverter (2) and finishes the operation.

Furthermore, if the operation has been set in response to the occurrence of the instantaneous power interrupt, the controller (11) determines a current operation state of the motor (3) (S37). That is, the controller (11) determines whether the motor (3) is running under a fixed (constant) speed operation, accelerated operation or decelerated operation.

As a result of S37, if it is determined that the outage has occurred under the fixed speed operation, the controller (11) performs the instantaneous power interrupt operation in response to the fixed speed operation of the motor (3) (S38). As a result of S37, if it is determined that the outage has occurred under the accelerated speed operation, the controller (11) performs the instantaneous power interrupt operation in response to the accelerated operation of the motor (3) (S39). As a result of S37, if it is determined that the outage has occurred under the decelerated speed operation, the controller (11) performs the instantaneous power interrupt operation in response to the decelerated operation of the motor (3) (S40).

Figure 4:
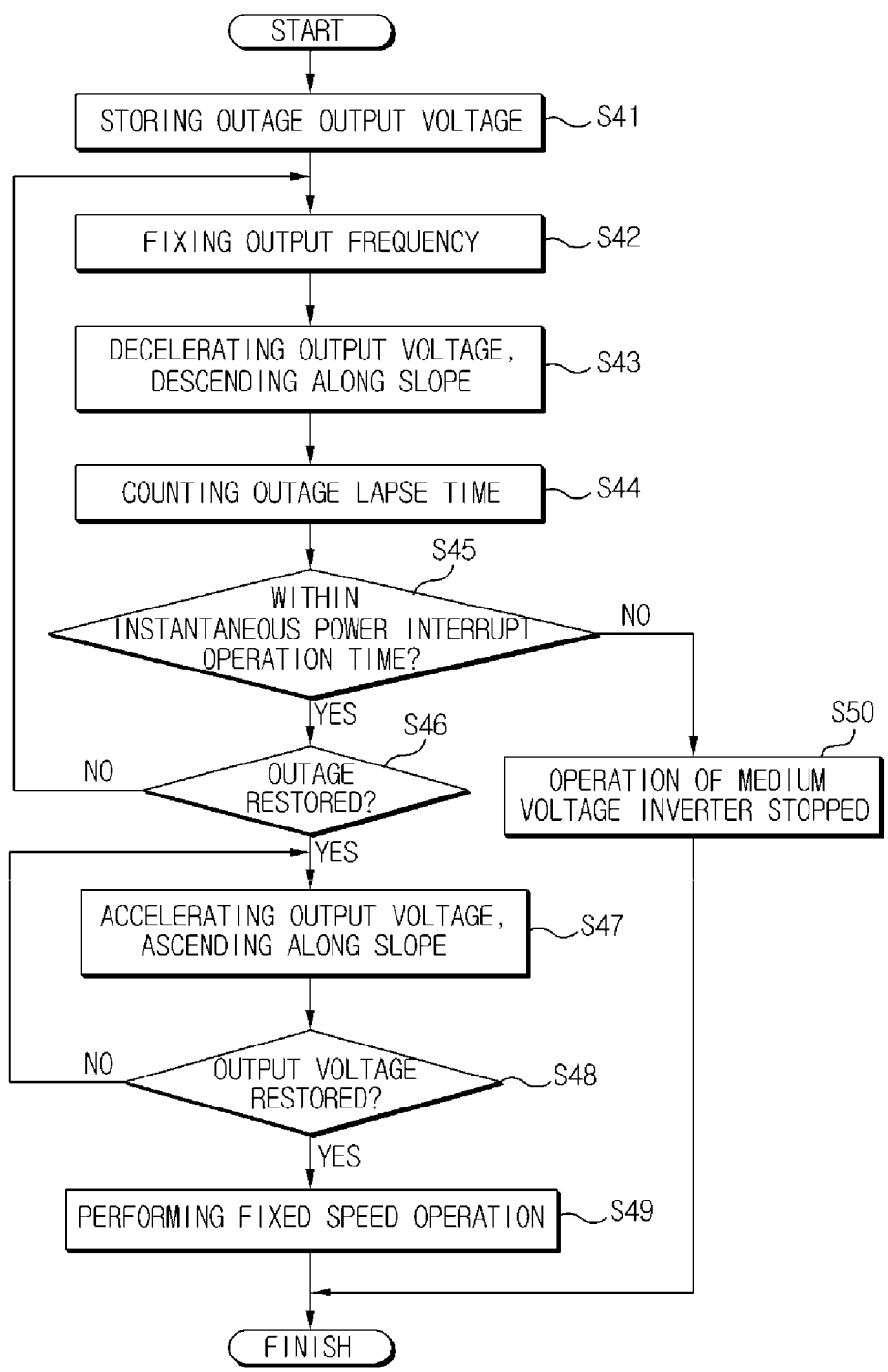
FIG. 4 is a detailed flowchart illustrating a method for controlling a medium voltage inverter during an instantaneous power interrupt in response to a fixed operation at S38 of FIG. 3 according to an exemplary embodiment of the present disclosure.
Figure 5:
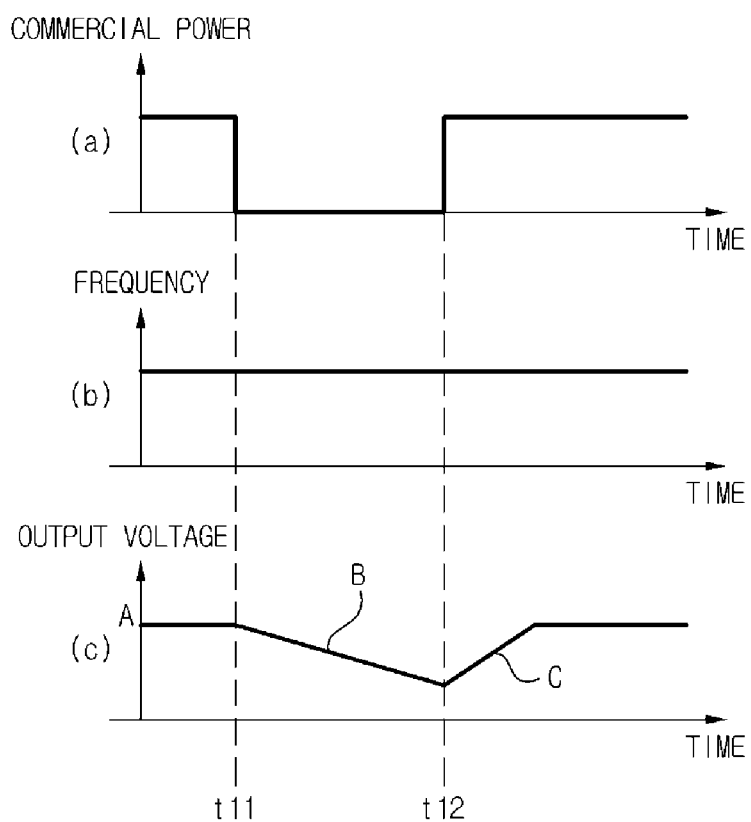
FIG. 5 is a schematic view illustrating a relationship among a commercial power, a frequency and an output voltage during control of FIG. 4.

FIG. 4 is a detailed flowchart illustrating a method for controlling a medium voltage inverter during an instantaneous power interrupt in response to a fixed speed operation at S38 of FIG. 3 according to an exemplary embodiment of the present disclosure, and FIG. 5 is a schematic view illustrating a relationship among a commercial power, a frequency and an output voltage during control of FIG. 4.

Referring to FIG. 4, the controller (11) stores a fixed speed output voltage (A) outputted by the medium voltage inverter (2) to the motor (3), in a case an outage occurs at a time (t11) at FIG. 5(a), while the medium voltage inverter (2) is running the motor (3) under the fixed speed operation (S41).

Furthermore, the controller (11) fixes an output frequency outputted by the medium voltage inverter (2) to the motor (3) to an output frequency prior to occurrence of instantaneous power interrupt as in FIG. 5(b) (S42), and descends the output voltage outputted by the medium voltage inverter (2) to the motor (3) along a decelerated slope (B) preset as in FIG. 5(c), and outputs the output voltage (S43).

Under these circumstances, the controller (11) counts a lapse time subsequent to occurrence of the outage (S44), and determines whether the counted lapse time is within a preset instantaneous power interrupt operation time (S45).

As a result of S45, if it is determined that the counted lapse time is within a preset instantaneous power interrupt operation time, the controller (11) determines whether the outage is restored and an AC power is normally inputted using the output signal of the outage detector (12) (S46).

As a result of S46, if it is determined that the outage is not restored, the controller (11) returns to S42 to fix the output frequency outputted by the medium voltage inverter (2) to the motor (3) (S42), and keeps outputting the output voltage outputted by the medium voltage inverter (2) to the motor (3) along the preset decelerated slope (S43), and repeatedly performs the operations (S44, S45) determining whether the preset instantaneous power interrupt operation time has lapsed.

Under these circumstances, if the outage is restored as in FIG. 5(a) within the preset instantaneous power interrupt operation time (t12) to allow the AC power to be supplied again, the controller (11) increases the output voltage outputted by the medium voltage inverter (2) to the motor (3) along an accelerated slope (C) preset as in FIG. 5(c), and outputs the output voltage (S47).

Under these circumstances, the controller (11) determines whether the output voltage outputted by the medium voltage inverter (2) to the motor (3) has been restored to a voltage prior to the outage (S48), and as a result of the determination, if it is determined that the output voltage outputted by the medium voltage inverter (2) to the motor (3) has been restored to a voltage prior to the outage, the controller (11) normally controls the medium voltage inverter (2) to drive the motor (3) at the fixed speed again (S49).

Furthermore, as a result of the determination, if it is determined that the outage is not restored even after lapse of the preset instantaneous power interrupt, the controller (11) stops the operation of the medium voltage inverter (2) (S50) and finishes the operation in response to occurrence of the instantaneous power interrupt.

Figure 6:
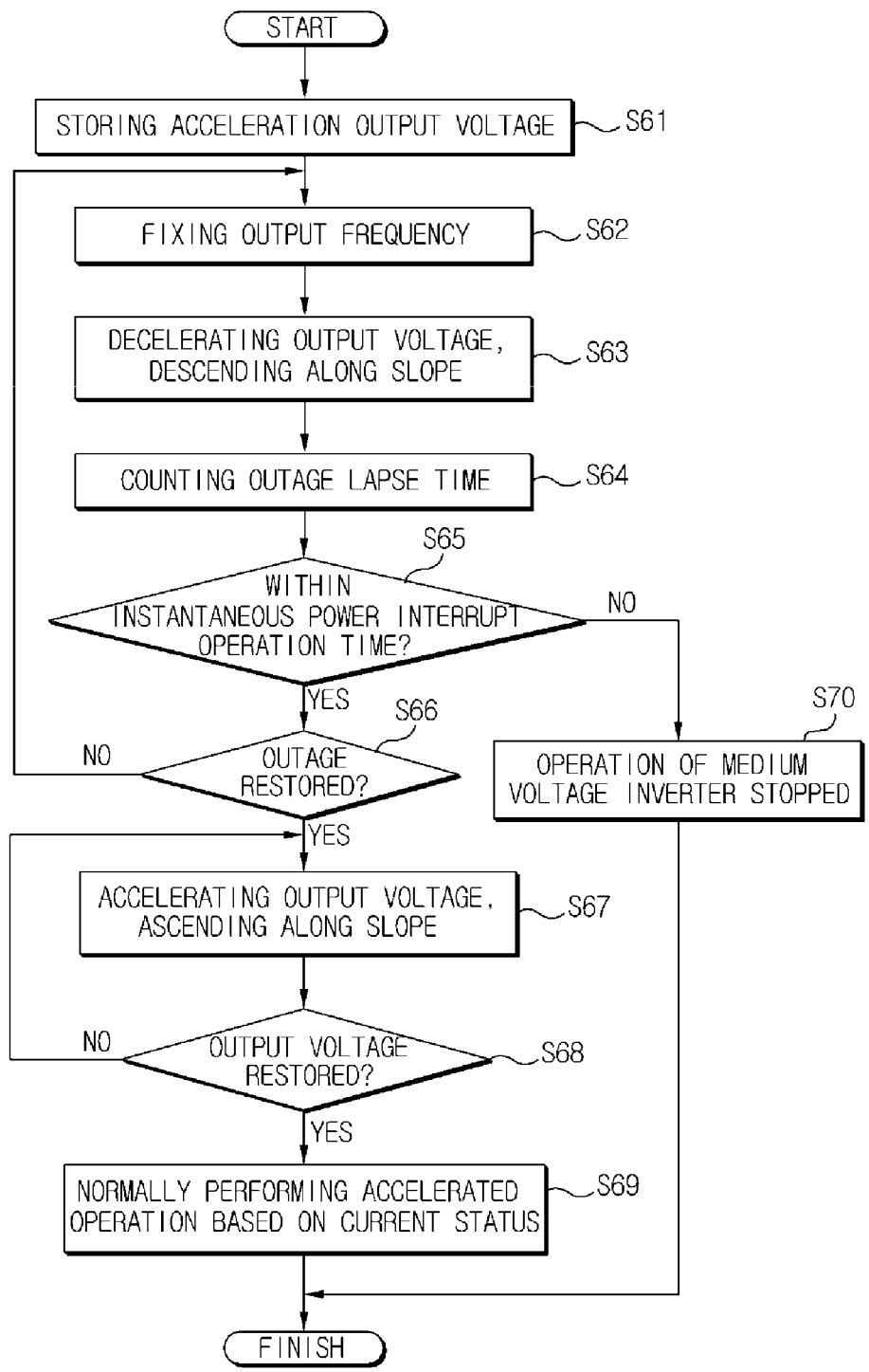
FIG. 6 is a detailed flowchart illustrating a method for controlling a medium voltage inverter during an instantaneous power interrupt in response to an accelerated operation at S39 of FIG. 3 according to an exemplary embodiment of the present disclosure.
Figure 7:
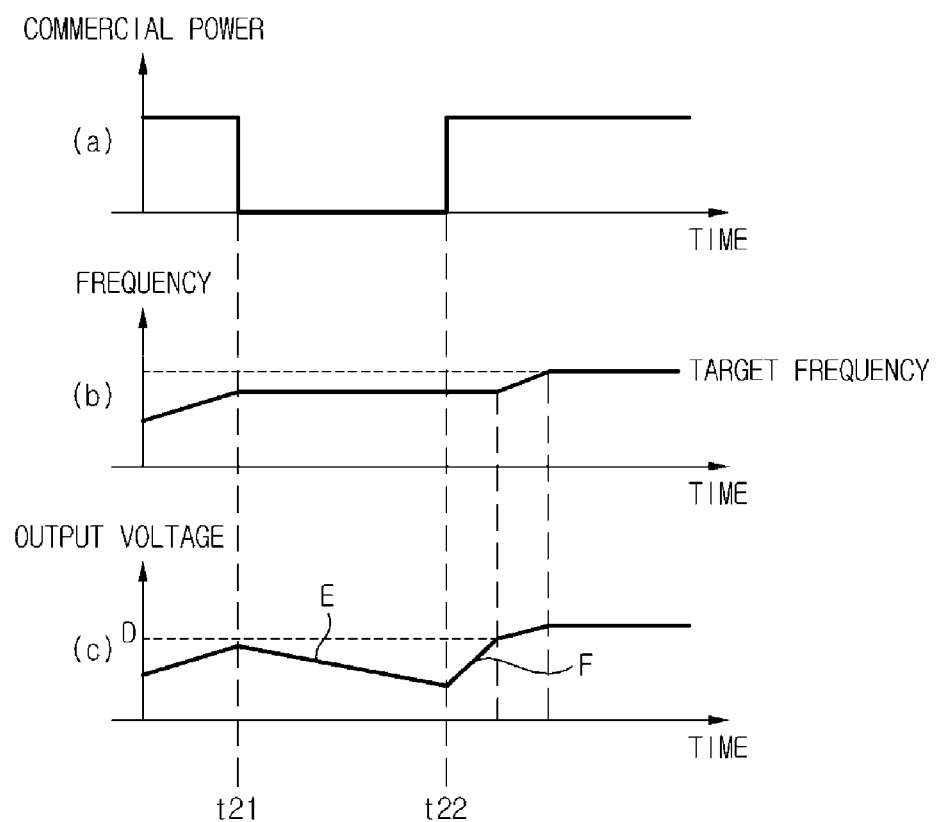
FIG. 7 is a schematic view illustrating a relationship among a commercial power, a frequency and an output voltage during control of FIG. 6.

FIG. 6 is a detailed flowchart illustrating a method for controlling a medium voltage inverter during an instantaneous power interrupt in response to an accelerated operation at S39 of FIG. 3 according to an exemplary embodiment of the present disclosure, and FIG. 7 is a schematic view illustrating a relationship among a commercial power, a frequency and an output voltage during control of FIG. 6.

Referring to FIG. 6, the controller (11) stores an accelerated speed output voltage (D) outputted by the medium voltage inverter (2) to the motor (3) as in FIG. 7(c), in a case an outage occurs at a time (t21) at FIG. 7(a), while the medium voltage inverter (2) increases a frequency outputted to the motor (3) as in FIG. 7(b), and increases a voltage outputted to the motor as in FIG. 7(c) to perform an accelerated operation (S61).

Furthermore, the controller (11) fixes an output frequency outputted by the medium voltage inverter (2) to the motor (3) as in FIG. 7(b) (S62), and decreases the output voltage outputted by the medium voltage inverter (2) to the motor (3) along a decelerated slope (E) preset as in FIG. 7(c), and outputs the output voltage (S63).

Under these circumstances, the controller (11) counts a lapse time subsequent to occurrence of the outage (S64), and determines whether the counted lapse time is within a preset instantaneous power interrupt operation time (S65).

As a result of S65, if it is determined that the counted lapse time is within a preset instantaneous power interrupt operation time, the controller (11) determines whether the outage is restored and an AC power is normally inputted using the output signal of the outage detector (12) (S66).

As a result of S66, if it is determined that the outage is not restored, the controller (11) returns to S62 to fix the output frequency outputted by the medium voltage inverter (2) to the motor (3) (S62), and keeps outputting the output voltage outputted by the medium voltage inverter (2) to the motor (3) along the preset decelerated slope (S63), and repeatedly performs the operations (S64, S65) determining whether the preset instantaneous power interrupt operation time has lapsed.

Under these circumstances, if the outage is restored as in FIG. 7 (a) within the preset instantaneous power interrupt operation time (t22) to allow the AC power to be supplied again, the controller (11) increases the output voltage outputted by the medium voltage inverter (2) to the motor (3) along an accelerated slope (F) preset as in FIG. 7(c) and outputs the output voltage (S67).

Under these circumstances, the controller (11) determines whether the output voltage outputted by the medium voltage inverter (2) to the motor (3) has been restored to the voltage (D) prior to the outage (S68), and as a result of the determination, if it is determined that the output voltage outputted by the medium voltage inverter (2) to the motor (3) has been restored to the voltage (D) prior to the outage, the controller (11) increases the output voltage outputted by the medium voltage inverter (2) to the motor (3) to a target voltage to allow the medium voltage inverter (2) to normally drive the motor (3) at the accelerated speed again (S69).

Furthermore, as a result of the determination, if it is determined that the outage is not restored even after lapse of the preset instantaneous power interrupt, the controller (11) stops the operation of the medium voltage inverter (2) (S70) and finishes the operation in response to occurrence of the instantaneous power interrupt.

FIG. 8 is a detailed flowchart illustrating a method for controlling a medium voltage inverter during an instantaneous power interrupt in response to a decelerated operation at S40 of FIG. 3 according to an exemplary embodiment of the present disclosure, and FIG. 9 is a schematic view illustrating a relationship among a commercial power, a frequency and an output voltage during control of FIG. 8.

Referring to FIG. 8, the controller (11) stores an output voltage (G) currently outputted by the medium voltage inverter (2) to the motor (3) as in FIG. 9(c), in a case an outage occurs at a time (t31) illustrated FIG. 9(a), while the medium voltage inverter (2) decreases a frequency outputted to the motor (3) as in FIG. 9(b), and decreases a voltage outputted to the motor (3) as in FIG. 9(c) to perform an accelerated operation (S81).

Furthermore, the controller (11) fixes an output frequency outputted by the medium voltage inverter (2) to the motor (3) as in FIG. 9(b) (S82), and decreases the output voltage outputted by the medium voltage inverter (2) to the motor (3) along a decelerated slope (H) preset as in FIG. 9(c), and outputs the output voltage (S83).

Under these circumstances, the controller (11) counts a lapse time subsequent to occurrence of the outage (S84), and determines whether the counted lapse time is within a preset instantaneous power interrupt operation time (S85).

As a result of S85, if it is determined that the counted lapse time is within a preset instantaneous power interrupt operation time, the controller (11) determines whether the outage is restored and an AC power is normally inputted using the output signal of the outage detector (12) (S86).

As a result of S86, if it is determined that the outage is not restored, the controller (11) returns to S82 to fix the output frequency outputted by the medium voltage inverter (2) to the motor (3) (S82), and keeps outputting the output voltage outputted by the medium voltage inverter (2) to the motor (3) along the preset decelerated slope (S83), and repeatedly performs the operations (S84, S85) determining whether the preset instantaneous power interrupt operation time has lapsed.

Under these circumstances, if the outage is restored as in FIG. 9(a) within the preset instantaneous power interrupt operation time (t32) to allow the AC power to be supplied again, the controller (11) increases the output voltage outputted by the medium voltage inverter (2) to the motor (3) along an decelerated slope (I) preset as in FIG. 9(c) and outputs the output voltage (S87).

Under these circumstances, the controller (11) determines whether the output voltage outputted by the medium voltage inverter (2) to the motor (3) has been restored to the voltage (G) prior to the outage (S88), and as a result of the determination at S88, if it is determined that the output voltage outputted by the medium voltage inverter (2) to the motor (3) has been restored to the voltage (G) prior to the outage, the controller (11) decreases the output voltage outputted by the medium voltage inverter (2) to the motor (3) to a target voltage (S89).

Furthermore, as a result of the determination at S85, if it is determined that the outage is not restored even after lapse of the preset instantaneous power interrupt, the controller (11) stops the operation of the medium voltage inverter (2) (S90) and finishes the operation in response to occurrence of the instantaneous power interrupt.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

The apparatus and method for controlling medium voltage inverter according to exemplary embodiments of the present disclosure have an industrial applicability in that a frequency outputted by the medium voltage inverter is fixed, in a case an instantaneous power interrupt occurs while the medium voltage inverter drives a motor, and an output voltage is reduced and outputted, such that no trip is generated on the medium voltage inverter, in a case the instantaneous power interrupt is restored within an operation set time of the instantaneous power interrupt to enable a normal operation of the motor again.

What is claimed is:

1. An apparatus for controlling an inverter, the apparatus comprising:
   a detector configured to detect whether power to the inverter fails or the power to the inverter is recovered; and
   a controller configured to:
   maintain an output frequency of the inverter at a frequency at a time of the power failure;
   decrease an output voltage of the inverter according to time while maintaining the output frequency, the voltage decrease being constant;
   control the inverter according to an operation status of the inverter at the time of the power failure when the detector detects the power recovery prior to lapse of a predetermined period, the operation status a fixed speed operation, an acceleration operation or a deceleration operation;
   increase the output voltage according to time while maintaining the output frequency when the operation status prior to the power failure is the acceleration operation; and
   increase the output voltage to a target voltage and increase the output frequency to a target frequency, the target voltage being a voltage of the inverter at the time of the power failure.

2. The apparatus of claim 1, wherein the controller is further configured to pre-set the voltage decrease according to time.

3. The apparatus of claim 1, wherein the controller is further configured to pre-set the voltage increase according to time, the voltage increase being constant.

4. The apparatus of claim 1, wherein the controller is further configured to:
   increase the output voltage according to a voltage increase according to time while maintaining the output frequency when the operation status prior to the power failure is the fixed speed operation.

5. The apparatus of claim 1, wherein the controller is further configured to:
   increase the output voltage according to time while maintaining the output frequency when the operation status prior to the power failure is the deceleration operation; and
   decrease the output voltage to a target voltage and decrease the output frequency to a target frequency, the target voltage being a voltage of the inverter at the time of the power failure.

* * * * *